(12) United States Patent
Csonka et al.

(10) Patent No.: US 11,716,140 B2
(45) Date of Patent: Aug. 1, 2023

(54) TWO-MIRROR TRACKING SYSTEM FOR FREE-SPACE OPTICAL COMMUNICATION

(71) Applicant: X Development LLC, Mountain View, CA (US)

(72) Inventors: Paul Csonka, Redwood City, CA (US); Klaus Ulander, Livermore, CA (US); Baris Ibrahim Erkmen, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 437 days.

(21) Appl. No.: 16/256,406

(22) Filed: Jan. 24, 2019

(65) Prior Publication Data
US 2020/0244359 A1    Jul. 30, 2020

(51) Int. Cl.
*H04B 10/112* (2013.01)
*H04B 10/11* (2013.01)
(Continued)

(52) U.S. Cl.
CPC .......... *H04B 10/11* (2013.01); *G02B 7/1821* (2013.01); *G02B 7/1827* (2013.01); *G02B 26/0833* (2013.01); *H04B 10/1123* (2013.01)

(58) Field of Classification Search
CPC .............................................. H04B 10/11–118
(Continued)

(56) References Cited

U.S. PATENT DOCUMENTS

| 4,982,445 A | * | 1/1991 | Grant | ................... | H04B 10/118 250/491.1 |
| 5,237,444 A | * | 8/1993 | Schermer | ............. | G02B 26/105 359/202.1 |

(Continued)

FOREIGN PATENT DOCUMENTS

| EP | 0317374 A2 | 5/1989 |
| EP | 2456099 A1 | 5/2012 |

(Continued)

OTHER PUBLICATIONS

International Search Report and Written Opinion for Application No. PCT/US2020/014365 dated May 4, 2020.

(Continued)

*Primary Examiner* — Li Liu
(74) *Attorney, Agent, or Firm* — Botos Churchill IP Law

(57) ABSTRACT

The disclosure provides a system for transmitting and receiving optical signals. The system includes a first mirror of a communication device, a first mirror actuator configured to control a pointing direction of the first mirror, a second mirror of the communication device, a second mirror actuator configured to control a pointing direction of the second mirror, and one or more processors. The one or more processors are configured to direct the second mirror actuator to move the second mirror to track a signal within a zone in an area of coverage of the communication device and meanwhile keep the first mirror stationary at a first angle. The one or more processors are also configured to direct the first mirror actuator to move the first mirror to a second (Continued)

angle in a direction of motion of the signal when the signal reaches an edge of the zone and meanwhile move the second mirror to a default angle.

13 Claims, 7 Drawing Sheets

(51) Int. Cl.
    *G02B 7/182*     (2021.01)
    *G02B 26/08*     (2006.01)

(58) Field of Classification Search
    USPC .................................. 398/118–131
    See application file for complete search history.

(56) References Cited

U.S. PATENT DOCUMENTS

| | | | | |
|---|---|---|---|---|
| 5,282,073 A * | 1/1994 | Detour | H04B 10/11 | 356/141.3 |
| 5,475,520 A * | 12/1995 | Wissinger | H04B 10/118 | 342/354 |
| 5,592,320 A * | 1/1997 | Wissinger | H04B 10/118 | 398/121 |
| 5,594,580 A * | 1/1997 | Sakanaka | H04B 10/1125 | 398/122 |
| 5,627,669 A * | 5/1997 | Orino | H04B 10/118 | 398/129 |
| 5,689,354 A * | 11/1997 | Ohno | H04B 10/1125 | 398/129 |
| 5,770,850 A * | 6/1998 | Bowen | G01J 1/02 | 250/203.1 |
| 5,786,923 A * | 7/1998 | Doucet | H04B 10/1121 | 398/122 |
| 6,091,528 A | 7/2000 | Kanda | | |
| 6,271,953 B1 * | 8/2001 | Dishman | H04B 10/118 | 398/129 |
| 6,278,100 B1 * | 8/2001 | Friedman | G01C 11/00 | 250/201.9 |
| 6,297,897 B1 * | 10/2001 | Czichy | H04B 10/118 | 398/122 |
| 6,327,063 B1 * | 12/2001 | Rockwell | H04B 10/118 | 398/122 |
| 6,335,811 B1 * | 1/2002 | Sakanaka | H04B 10/11 | 398/129 |
| 6,347,001 B1 * | 2/2002 | Arnold | H04B 10/118 | 398/122 |
| 6,469,815 B1 * | 10/2002 | Poon | H04B 10/118 | 398/131 |
| 6,493,122 B1 * | 12/2002 | Degura | H04B 10/1125 | 398/106 |
| 6,535,314 B1 * | 3/2003 | Mendenhall | H04B 10/118 | 250/491.1 |
| 6,590,685 B1 * | 7/2003 | Mendenhall | G01S 3/786 | 250/491.1 |
| 7,120,363 B2 * | 10/2006 | Andreu-von Euw | H04B 10/1127 | 398/129 |
| 7,277,641 B1 * | 10/2007 | Gleckman | H04B 10/118 | 398/128 |
| 7,292,788 B2 * | 11/2007 | Triebes | H04B 10/1125 | 398/121 |
| 9,407,363 B2 * | 8/2016 | Aoki | H04B 10/1121 | |
| 2002/0081060 A1 * | 6/2002 | Margalit | G02B 26/0841 | 385/18 |
| 2002/0131121 A1 * | 9/2002 | Jeganathan | H04B 10/1127 | 398/128 |
| 2002/0141020 A1 * | 10/2002 | Doucet | H04L 5/16 | 398/121 |
| 2002/0196506 A1 * | 12/2002 | Graves | H04B 10/1125 | 398/126 |
| 2004/0141753 A1 * | 7/2004 | Andreu-von Euw | H04B 10/1127 | 398/122 |
| 2004/0208597 A1 * | 10/2004 | Wittenberger | H04B 10/1127 | 398/130 |
| 2004/0258415 A1 * | 12/2004 | Boone | H04B 10/1125 | 398/125 |
| 2005/0069325 A1 * | 3/2005 | Cicchiello | H04B 7/18504 | 398/122 |
| 2007/0031150 A1 * | 2/2007 | Fisher | H04B 10/1125 | 398/128 |
| 2007/0031151 A1 | 2/2007 | Cunningham et al. | | |
| 2012/0114337 A1 * | 5/2012 | Aoki | H04B 10/1121 | 398/135 |
| 2015/0205273 A1 * | 7/2015 | Shimizu | H04B 10/112 | 700/19 |
| 2015/0244458 A1 * | 8/2015 | Erkmen | H04B 10/1125 | 398/122 |

FOREIGN PATENT DOCUMENTS

| | | | |
|---|---|---|---|
| EP | 2879313 A1 | 6/2015 | |
| EP | 3244228 A1 | 11/2017 | |
| JP | H10233738 A | 9/1998 | |
| JP | 2004363669 | * 12/2004 | ............ H04B 10/10 |
| JP | 2004363669 A | 12/2004 | |
| JP | 3859335 B2 | 9/2006 | |

OTHER PUBLICATIONS

Notice of Reasons for Rejection for Japanese Patent Application No. 2021-532181, dated Aug. 12, 2022.

Decision to Grant a Patent for Japanese Patent Application No. 2021-532181, dated Apr. 18, 2023.

\* cited by examiner

TWO-MIRROR TRACKING SYSTEM FOR FREE-SPACE OPTICAL COMMUNICATION

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

BRIEF SUMMARY

Aspects of the disclosure provide for a system for transmitting and receiving optical signals. The system includes a first mirror of a communication device; a first mirror actuator configured to control a pointing direction of the first mirror; a second mirror of the communication device; a second mirror actuator configured to control a pointing direction of the second mirror; and one or more processors operatively coupled to the first mirror actuator and the second mirror actuator, the one or more processors being configured to direct the second mirror actuator to move the second mirror to track a signal within a zone in an area of coverage of the communication device, keep the first mirror stationary at a first angle while tracking the signal in the zone, direct the first mirror actuator to move the first mirror to a second angle in a direction of motion of the signal when the signal reaches an edge of the zone, and direct the second mirror actuator to move the second mirror to a default angle while moving the first mirror to the second angle.

In one example, the first mirror is kept stationary at the first angle by turning off power to the first mirror actuator. In another example, the first mirror is kept stationary at the first angle by locking the first mirror at the first angle using the first mirror actuator before turning off power to the first mirror actuator. In a further example, the area of coverage of the communication device is determined by combining a range of motion of the first mirror and a range of motion of the second mirror.

In yet another example, the zone is a first zone in a plurality of zones in the area of coverage, an area of each zone of the plurality of zones is a percentage of a range of motion of the second mirror. In this example, the one or more processors are also configured to move the second mirror to track a signal within a second zone of the plurality of zones, and keep the first mirror stationary at the second angle while tracking the signal in the second zone.

In a still further example, the second angle is a set interval from the first angle. In another example, the first mirror actuator is configured to control the pointing direction of the first mirror to a plurality of predetermined angles. In this example, the plurality of predetermined angles including the first angle and the second angle. In yet another example, the one or more processors are also configured to operate the communication device according to the signal by transmitting a second signal to a second communication device, or adjusting a pointing direction of the communication device. In a further example, the system also includes the communication device.

Other aspects of the disclosure provide for a system for transmitting and receiving optical signals. The system includes a first mirror of a communication device; a first mirror actuator configured to control a pointing direction of the first mirror; a second mirror of the communication device; a second mirror actuator configured to control a pointing direction of the second mirror; and one or more processors operatively coupled to the first mirror actuator and the second mirror actuator. The one or more processors are configured to direct the second mirror actuator to move the second mirror in a first direction from a default angle to track a signal; after the second mirror is moved in the first direction, direct the first mirror actuator to move the first mirror in the first direction; and while moving the first mirror in the first direction, direct the second mirror actuator to move the second mirror in a second direction opposite the first direction.

Further aspects of the disclosure provide for a method for transmitting and receiving optical signals. The method includes controlling, by one or more processors, a second mirror actuator to move a second mirror of a communication device to track a signal within a zone in an area of coverage of the communication device; keeping a first mirror of the communication device stationary at a first angle while tracking the signal in the zone; when the signal reaches an edge of the zone, the one or more processors controlling a first mirror actuator to move the first mirror to a second angle in a direction of motion of the signal; and the one or more processors controlling the second mirror actuator to move the second mirror to a default angle while controlling the first mirror actuator to move the first mirror to the second angle.

In one example, keeping the first mirror stationary at the first angle includes turning off power to the first mirror actuator. In another example, keeping the first mirror stationary at the first angle includes locking the first mirror at the first angle using the first mirror actuator before turning off power to the first mirror actuator. In a further example, the method also includes determining, by the one or more processors, the area of coverage of the communication device by combining a range of motion of the first mirror and a range of motion of the second mirror.

In yet another example, the zone is a first zone in a plurality of zones in the area of coverage. In this example, the method also includes determining, by the one or more processors, an area of each zone of the plurality of zones based on a percentage of a range of motion of the second mirror. Also in this example, the method also includes the one or more processors controlling the second mirror actuator to move the second mirror to track a signal within a second zone of the plurality of zones; and keeping the first mirror stationary at the second angle while tracking the signal in the second zone.

In a still further example, the second angle is a set interval from the first angle. In another example, moving the first mirror includes selecting the second angle from a plurality of predetermined angles, the plurality of predetermined angles including the first angle and the second angle. In yet another example, the method also includes operating, by the one or more processors, the communication device according to the signal by transmitting a second signal to a second communication device or adjusting a pointing direction of the communication device.

DETAILED DESCRIPTION

Overview

The technology relates to a free-space optical communication system that includes two or more steering mirrors configured to accurately point or track an optical signal. The two or more steering mirrors may include at least a first mirror and a second mirror, or another combination of optical components. The FSOC system includes two or more actuators configured to control the pointing direction of each of the steering mirrors. For example, a first actuator may be configured to control the pointing direction of the first mirror along a first axis and a second axis, and a second actuator may be configured to control the pointing direction of the second mirror along a third axis and a fourth axis. The combination of the first mirror pointing direction and the second mirror pointing direction results in a pointing direction of the FSOC system.

In operation, the first mirror may be controlled to adjust for large angle disturbances or low frequency disturbances, and the second mirror may be controlled to adjust for small angle disturbances or high frequency disturbances. The first mirror may be held stationary, with or without power, while the second mirror is adjusted within a zone. The first mirror may be adjusted when the second mirror reaches an edge of the zone. Alternatively, other types of optical components may be utilized in combination with or in place of the two or more steering mirrors.

The features described above provide an FSOC system that accurately points and tracks optical signals. In addition, the features can reduce the overall cost to operate the actuators, and may extend the lifetime and performance of the system. In addition, power savings to the system may also be achieved.

Example Systems

Figure 1:
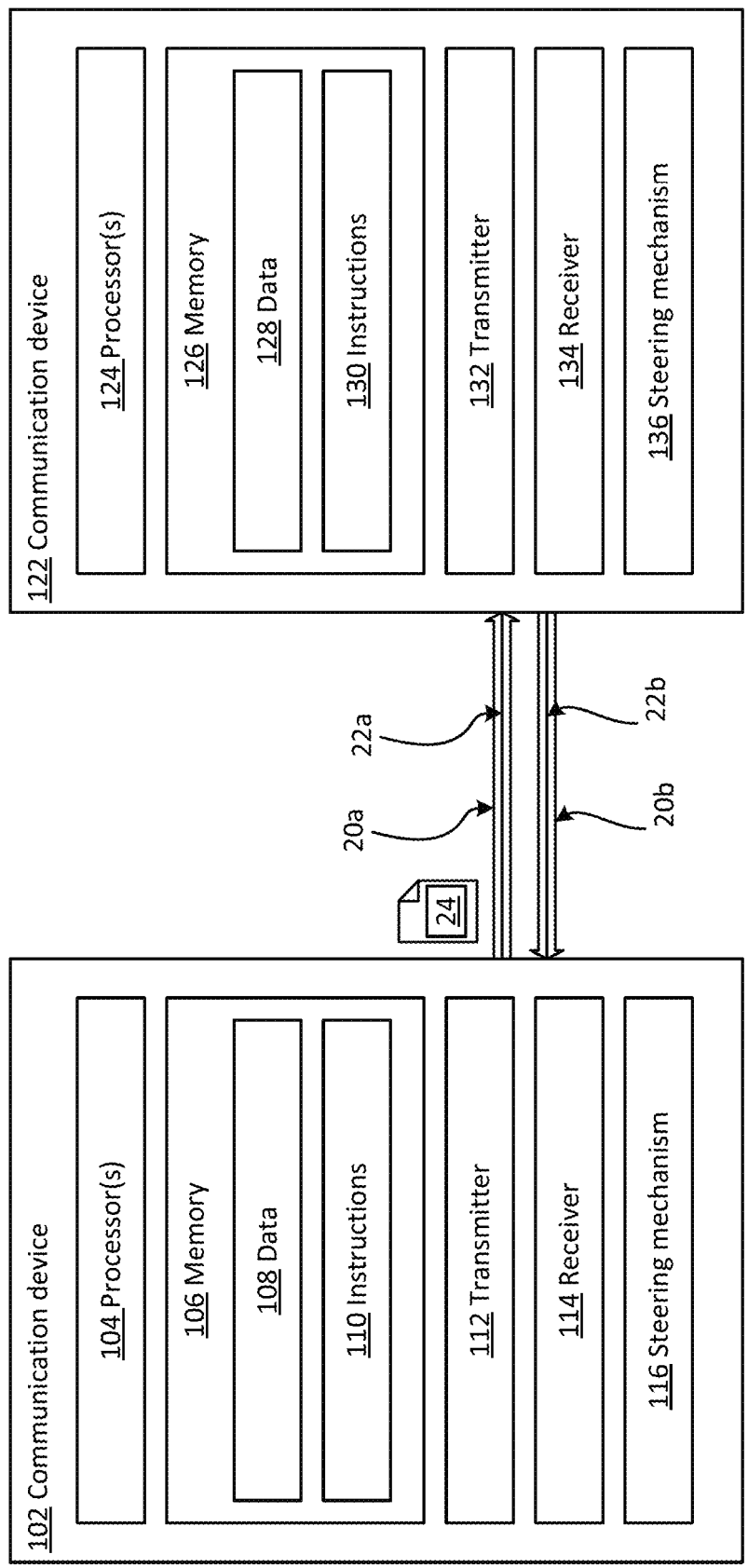
FIG. 1 is a block diagram 100 of a first communication device and a second communication device in accordance with aspects of the disclosure.

FIG. 1 is a block diagram 100 of a first communication device 102 of a first communication terminal configured to form one or more links with a second communication device 122 of a second communication terminal, for instance as part of a system such as a free-space optical communication (FSOC) system. For example, the first communication device 102 includes one or more processors 104, a memory 106, a transmitter 112, a receiver 114, and a steering mechanism 116.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may be configured to output a beacon beam 20 that allows one communication device to locate another, as well as a communication signal over a communication link 22. The communication signal may be a signal configured to travel through free space, such as, for example, a radio-frequency signal or optical signal. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 20 may illuminate a larger solid angle in space than the optical communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

As shown in FIG. 1, the transmitter 112 of the first communication device 102 is configured to output a beacon beam 20a to establish a communication link 22a with the second communication device 122, which receives the beacon beam 20a. The first communication device 102 may align the beacon beam 20a co-linearly with the optical communication beam (not shown) that has a narrower solid angle than the beacon beam 20a and carries a communication signal 24. As such, when the second communication device 122 receives the beacon beam 20a, the second communication device 122 may establish a line-of-sight link with the first communication device 102 or otherwise align with the first communication device. As a result, the communication link 22a that allows for the transmission of the optical communication beam (not shown) from the first communication device 102 to the second communication device 122 may be established.

The receiver 114 may include an optical fiber and a tracking system configured to detect the optical beam. The tracking system may include at least a tracking sensor. In addition, the tracking system may also include a lens, mirror, or other system configured to divert a portion of a received optical beam to the tracking sensor and allow the remaining portion of the received optical beam to couple with the optical fiber. The tracking sensor may include, but is not limited to, a position sensitive detector (PSD), a charge-coupled device (CCD) camera, a focal plane array, a photodetector, a quad-cell detector array, or a CMOS sensor. The tracking sensor is configured to detect a signal location at the tracking sensor and convert the received optical beam into an electric signal using the photoelectric effect. The tracking system is able to track the received optical beam, which may be used to direct the steering mechanism 116 to counteract disturbances due to scintillation and/or platform motion.

Figure 2:
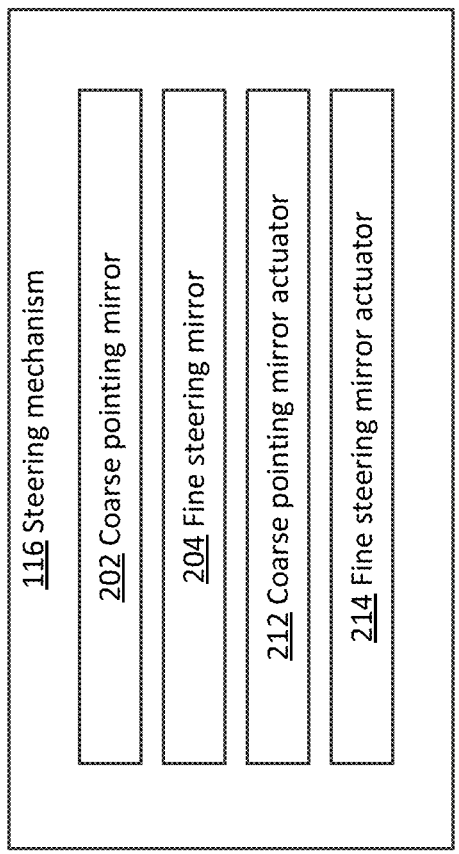
FIG. 2 is a block diagram 200 of a steering mechanism in accordance with aspects of the disclosure.

Furthermore, the one or more processors 104 are in communication with the steering mechanism 116 for adjusting the pointing direction of the transmitter 112, receiver 114, and/or optical beam. As shown in FIG. 2, the steering mechanism 116 includes a first mirror 202, a second mirror 204, a first actuator 212 configured to control the first mirror, and a second actuator 214 configured to control the second mirror. The first mirror 202 may have a first field of view, and the second mirror 204 may have a second field of view smaller than the first field of view. The first mirror 202 may be a coarse pointing mirror, and the second mirror 204 may be a fast steering mirror. The first mirror and the second mirror may be MEMS 2-axis mirrors, 2-axis voice coil mirrors, or piezo electronic 2-axis mirrors. The first mirror 202 may be an oval mirror having, e.g., a 10 cm minor radius and a 15 cm major radius. The second mirror 204 may be a circular mirror having, e.g., a 1 mm diameter. The first actuator 212 may be configured to control the pointing direction of the first mirror 202 along a first axis and a second axis, and the second actuator 214 is configured to control the pointing direction of the second mirror 204 along a third axis and a fourth axis. The pointing direction is the direction in which light travels from the steering mirror. For example, the first actuator 212 or the second actuator 214 may be configured to physically rotate or shift the corresponding steering mirror.

In other examples, rather than the first mirror 202 and/or the second mirror 204, different combinations of two or more optical components may be included in the FSOC system and controlled by two or more actuators. For example, the FSOC system may include a third mirror that has a field of view that is the same as or smaller than that of the second mirror 204, as well as a third actuator configured to control the third mirror. In another implementation, an optical component in the two or more optical components may be a mirror system including more than one mirror, one or more lenses, one or more prisms, one or more wedges, or one or more deformable optics, such as an adjustable liquid crystal optics, may be included in the FSOC system and controlled by two or more actuators. The two or more actuators may include different elements for the different types of optical components. For example, an actuator may be configured to rotate an optical component, such as a Risley prism, to adjust a pointing direction of the optical component. Elements for an actuator may include an electric motor, pneumatic motor, gearbox, transmission, linkage, electrostatic actuator, pump, and/or steerable crystal.

Figure 3B:
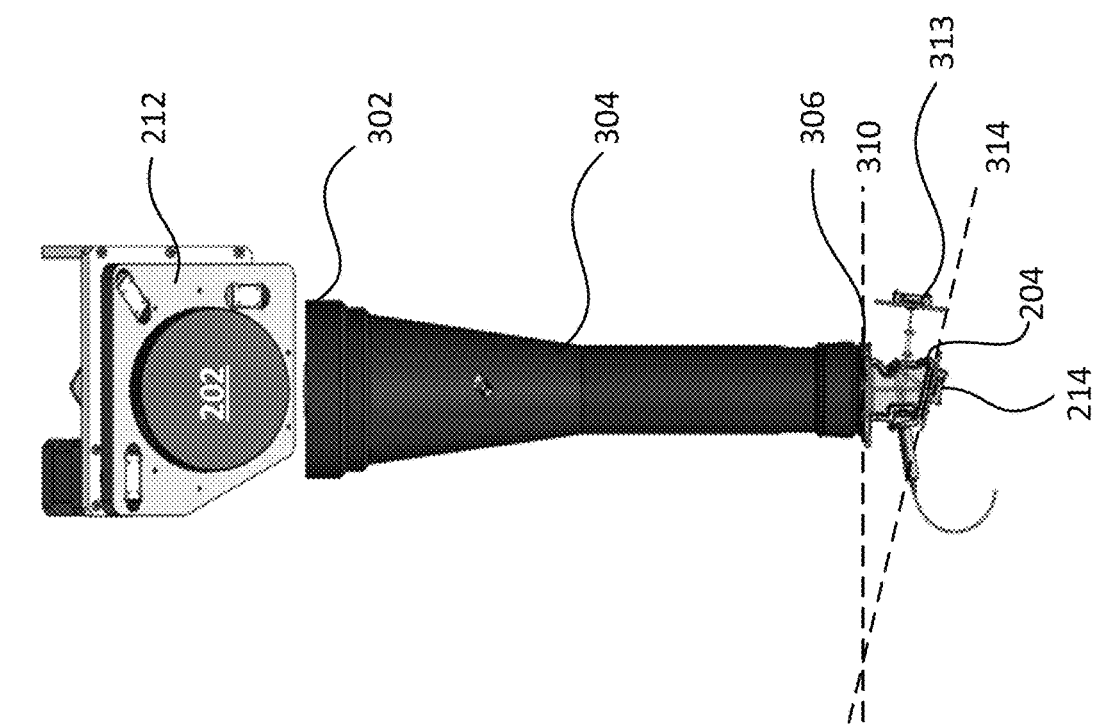
FIG. 3B is a pictorial diagram of the steering mechanism in FIG. 2 from a second view in accordance with aspects of the disclosure.
Figure 3A:
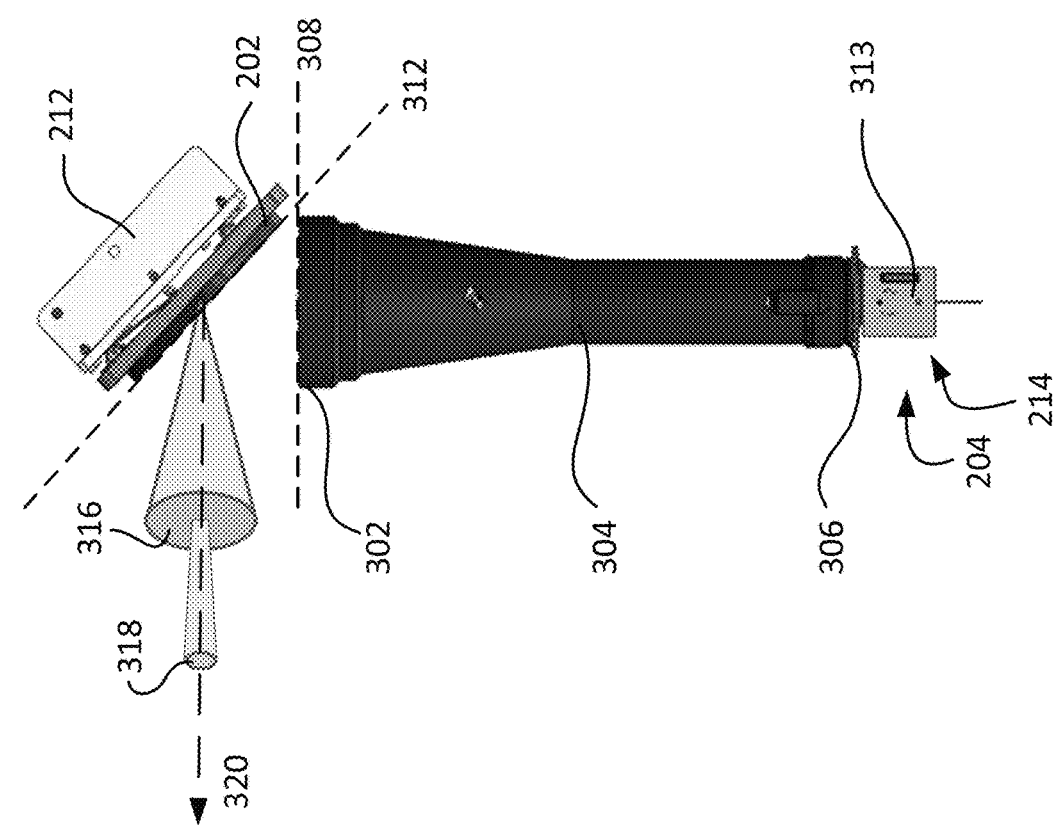
FIG. 3A is a pictorial diagram of the steering mechanism in FIG. 2 from a first view in accordance with aspects of the disclosure.

In the example system shown in FIGS. 3A and 3B, the first mirror 202 is positioned at a distal end 302 of an optical telescope 304, and the second mirror 204 is positioned at a proximal end 306 of the optical telescope 304. The first mirror actuator 212 is positioned at a back of the first mirror 202, and the second mirror actuator 214 is positioned at a back of the second mirror 204. The distal end 302 of the optical telescope 304 may be wider than the proximal end 306. The distal end 302 defines a plane 308, and the proximal end 306 defines a plane 310 that is parallel to the plane 308. FIG. 3A shows a first view of the example system, which shows a side profile of the first mirror 202 and the first mirror actuator 212. As shown in FIG. 3A, the first mirror 202 is at a first default angle 312 to the plane 308 of the distal end 302. The second mirror 204 and the second mirror actuator 214 are hidden by a back of a photodetector 313 of the receiver 114 in the first view. FIG. 3B shows a second view of the example system that is a 90° rotation from the first view from a center axis of the optical telescope 304. As shown in FIG. 3B, the second mirror 204 is at a second default angle 314 to the plane 310 of the proximal end 306.

When the first mirror 202 is at the first default angle 312 and the second mirror 204 is at the second default angle 314, the example system is configured to receive an outgoing optical signal from the first communication device 102 at the second mirror 204. The outgoing optical signal includes a beacon beam 316 and/or a communication beam 318. The second mirror 204 is configured to reflect the outgoing optical signal through the optical telescope 304 towards the first mirror 202, which then reflects the outgoing optical signal through free space along the axis 320. As shown in FIG. 3A, the beacon beam 316 and/or the communication beam 318 is centered about the axis 320 when transmitted from the first mirror 202. In this same configuration, the first mirror 202 is configured to receive an incoming optical signal, which includes a beacon beam and/or a communication beam, and reflect the incoming optical signal through the optical telescope 304 towards the second mirror 204, which then reflects the incoming optical signal through the rest of the first communication device 102.

The first mirror actuator 212 may be configured to tilt the first mirror 202 at angles different from the first default angle 312, and the second mirror actuator 214 may be configured to tilt the second mirror 204 at angles different from the second default angle 314. Changes to the angle of the first mirror 202 and/or the second mirror 204 may adjust a pointing direction of the first communication device 102. The adjustments to the pointing direction may be made to establish acquisition and connection link, such as communication link 22, between the first communication device 102 and the second communication device 122. In addition, the adjustments may optimize transmission of light from the transmitter and/or reception of light at the receiver. In some implementations, the one or more processors 104 may provide closed loop control for the steering mechanism 116 to adjust pointing direction based upon the optical signal received over the communication link from a transmitting communication device, such as an optical signal received over the communication link 22b from the second communication device 122.

Returning to FIG. 1, the second communication device 122 includes one or more processors, 124, a memory 126, a transmitter 132, a receiver 134, and a steering mechanism 136. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may be configured to output both an optical communication beam and a beacon beam. For example, transmitter 132 of the second communication device 122 may output a beacon beam 20b to establish a communication link 22b with the first communication device 102, which receives the beacon beam 20b. The second communication device 122 may align the beacon beam 20b co-linearly with the optical communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes an optical fiber and a tracking system configured to detect the optical beam with the same or similar features as described above with respect to the receiver 114. In addition, the tracking system may also include a lens, mirror, or other system configured to divert a portion of a received optical beam to the tracking sensor and allow the remaining portion of the received optical beam to couple with the optical fiber. The tracking system of receiver 134 is configured to track the received optical beam, which may be used to direct the steering mechanism 136 to counteract disturbances due to scintillation and/or platform motion.

The one or more processors 124 are in communication with the steering mechanism 136 for adjusting the pointing direction of the transmitter 132, receiver 134, and/or optical beam, as described above with respect to the steering mechanism 116. The adjustments to the pointing direction may be made to establish acquisition and connection link, such as communication link 22, between the first communication device 102 and the second communication device 122. In addition, the one or more processors 124 may provide closed loop control for the steering mechanism 136 to adjust pointing direction based upon the optical beam received over the communication link from a transmitting communication device, such as an optical beam received over the communication link 22a from the first communication device 102.

As shown in FIG. 1, the communication links 22a and 22b may be formed between the first communication device 102 and the second communication device 122 when the transmitters and receivers of the first and second communication devices are aligned. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 4:
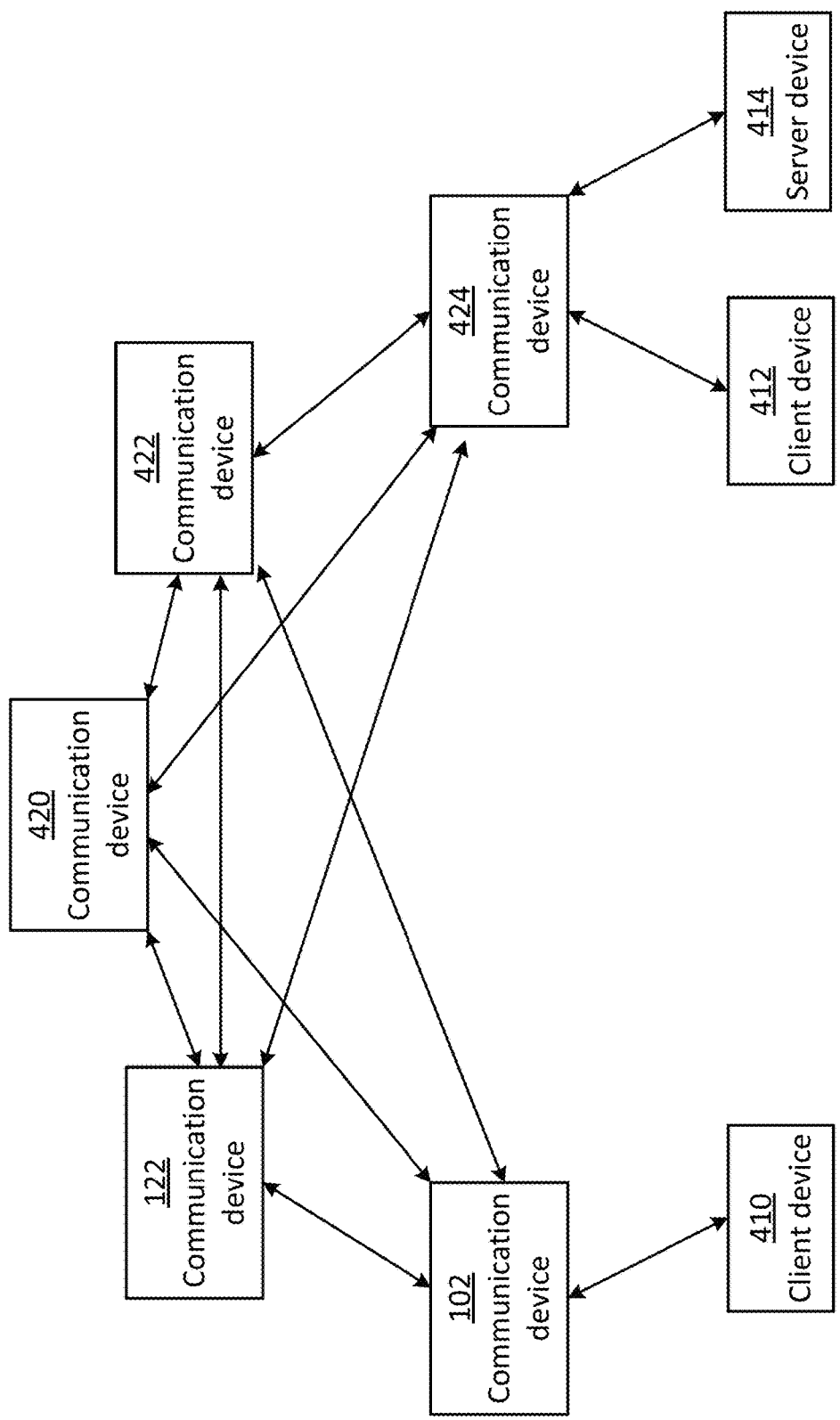
FIG. 4 is a pictorial diagram of a network 400 in accordance with aspects of the disclosure.

As shown in FIG. 4, a plurality of communication devices, such as the first communication device 102 and the second communication device 122, may be configured to form a plurality of communication links (illustrated as arrows) between a plurality of communication terminals, thereby forming a network 400. The network 400 may include client devices 410 and 412, server device 414, and communication devices 102, 122, 420, 422, and 424. Each of the client devices 410, 412, server device 414, and communication devices 420, 422, and 424 may include one or more processors, a memory, a transmitter, a receiver, and a steering mechanism similar to those described above. Using the transmitter and the receiver, each communication device in network 400 may form at least one communication link with another communication device, as shown by the arrows. The communication links may be for optical frequencies, radio frequencies, other frequencies, or a combination of different frequency bands. In FIG. 4, the communication device 102 is shown having communication links with client device 410 and communication devices 122, 420, and 422. The communication device 122 is shown having communication links with communication devices 102, 420, 422, and 424.

The network 400 as shown in FIG. 4 is illustrative only, and in some implementations the network 400 may include additional or different communication terminals. The network 400 may be a terrestrial network where the plurality of communication devices is on a plurality of ground communication terminals. In other implementations, the network 400 may include one or more high-altitude platforms (HAPs), which may be balloons, blimps or other dirigibles, airplanes, unmanned aerial vehicles (UAVs), satellites, or any other form of high altitude platform, or other types of moveable or stationary communication terminals. In some implementations, the network 400 may serve as an access network for client devices such as cellular phones, laptop computers, desktop computers, wearable devices, or tablet computers. The network 400 also may be connected to a larger network, such as the Internet, and may be configured to provide a client device with access to resources stored on or provided through the larger computer network.

Example Methods

The one or more processors 104 of the first communication device 102 may be configured to control the first mirror 202 and the second mirror 204 in order to track an optical signal received at the first communication device 102. In a first embodiment, the second mirror 204 may be moved for tracking an optical signal within a zone while the first mirror 202 may be kept stationary until the second mirror 204 reaches an edge of the zone. In a second embodiment, the first mirror 202 may be moved in a first direction after the second mirror 204 is moved away from its default angle to track an optical signal in the first direction.

Figure 5:
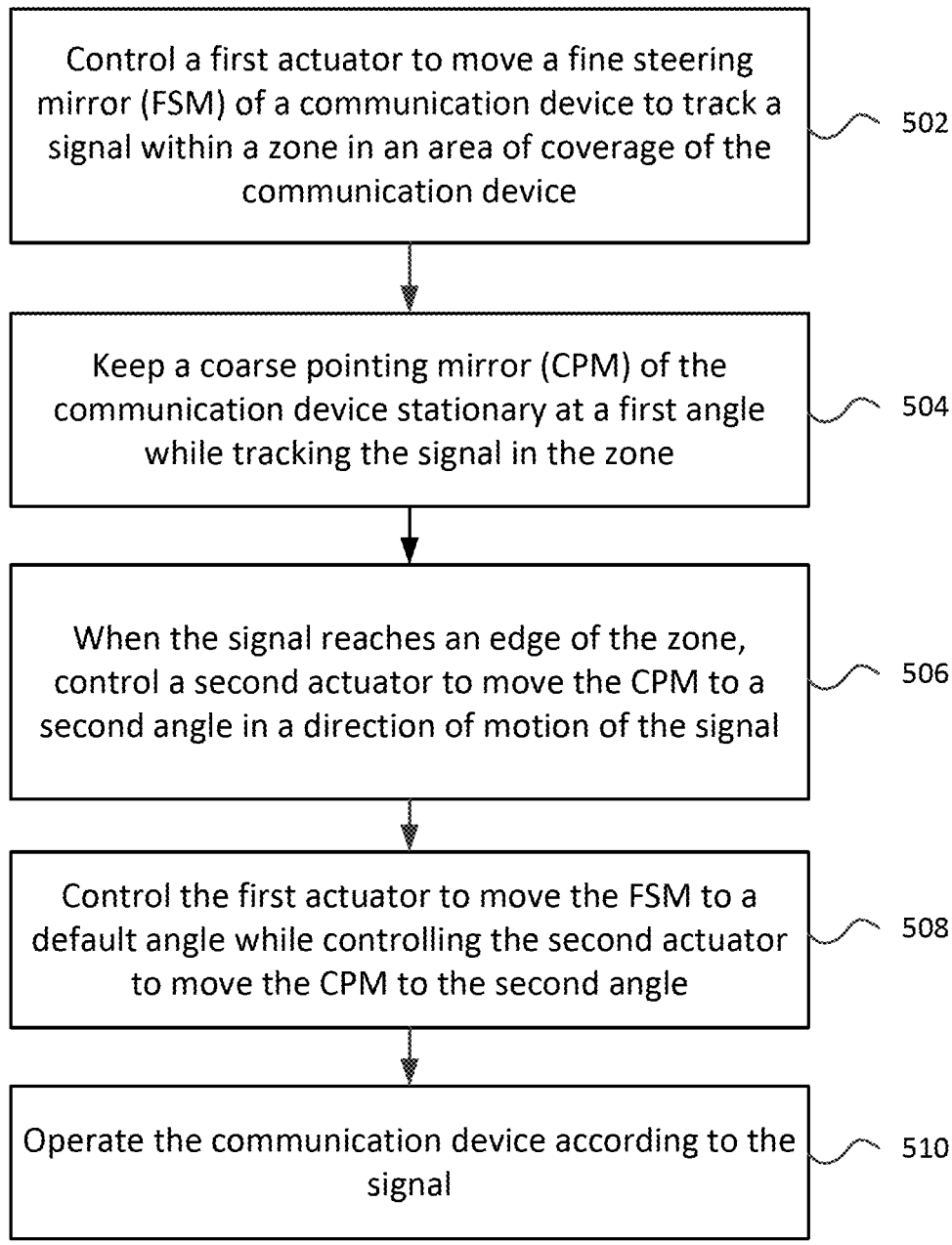
FIG. 5 is a flow diagram 500 in accordance with aspects of the disclosure.

In FIG. 5, flow diagram 500 is shown in accordance with the first embodiment that may be performed by the one or more processors 104 of the first communication device 102. While FIG. 5 shows blocks in a particular order, the order may be varied and multiple operations may be performed simultaneously. Also, operations may be added or omitted.

At block 502, the one or more processors 104 may use the second mirror actuator 214 to move the second mirror 204 to track an optical signal within a first zone in an area of coverage of the first communication device 102. The area of coverage of the first communication device 102 is a solid angle in which the first mirror 202 and the second mirror 204 may be rotated to cover. In other words, the area of coverage of the first communication device 102 is a combination of an area of coverage of the first mirror 202 and the area of coverage of the second mirror 204. The area of coverage of the first communication device 102 may be divided into a plurality of zones. Each zone may be, e.g., 50% of the second mirror area of coverage or another percentage less than 100%. For example, focusing on a range of motion along a first axis, the first mirror 202 may have a range of motion from −90° to 90° for a total range of 180°, and the second mirror 204 may have a range of motion from −30° to 30° for a total range of motion of 60°. The total range of motion along the first axis for the first communication device 102 may therefore be −120° to 120° for a total range of motion of 240°. Each zone in this example may 30°, which is 50% of the second mirror range of motion along the first axis. In this example, there may be a total of eight zones. Other examples may have more or fewer zones.

In addition, at block 504 the one or more processors 104 may keep the first mirror 202 stationary at a first angle while the optical signal is tracked within the first zone. The first mirror actuator 212 may be used to hold the first mirror 202 stationary at the first angle without power while the second mirror is moved within the zone. For example, the one or more processors 104 may use the first mirror actuator 212 to lock the first mirror 202 in the first angle while the second mirror 204 is moved within the zone. After the first mirror 202 is locked in the first angle, power to the first mirror actuator 212 may be turned off. The first angle along the first axis may be, e.g., 0°, 15°, or other angle within the first mirror area of coverage.

Figure 6:
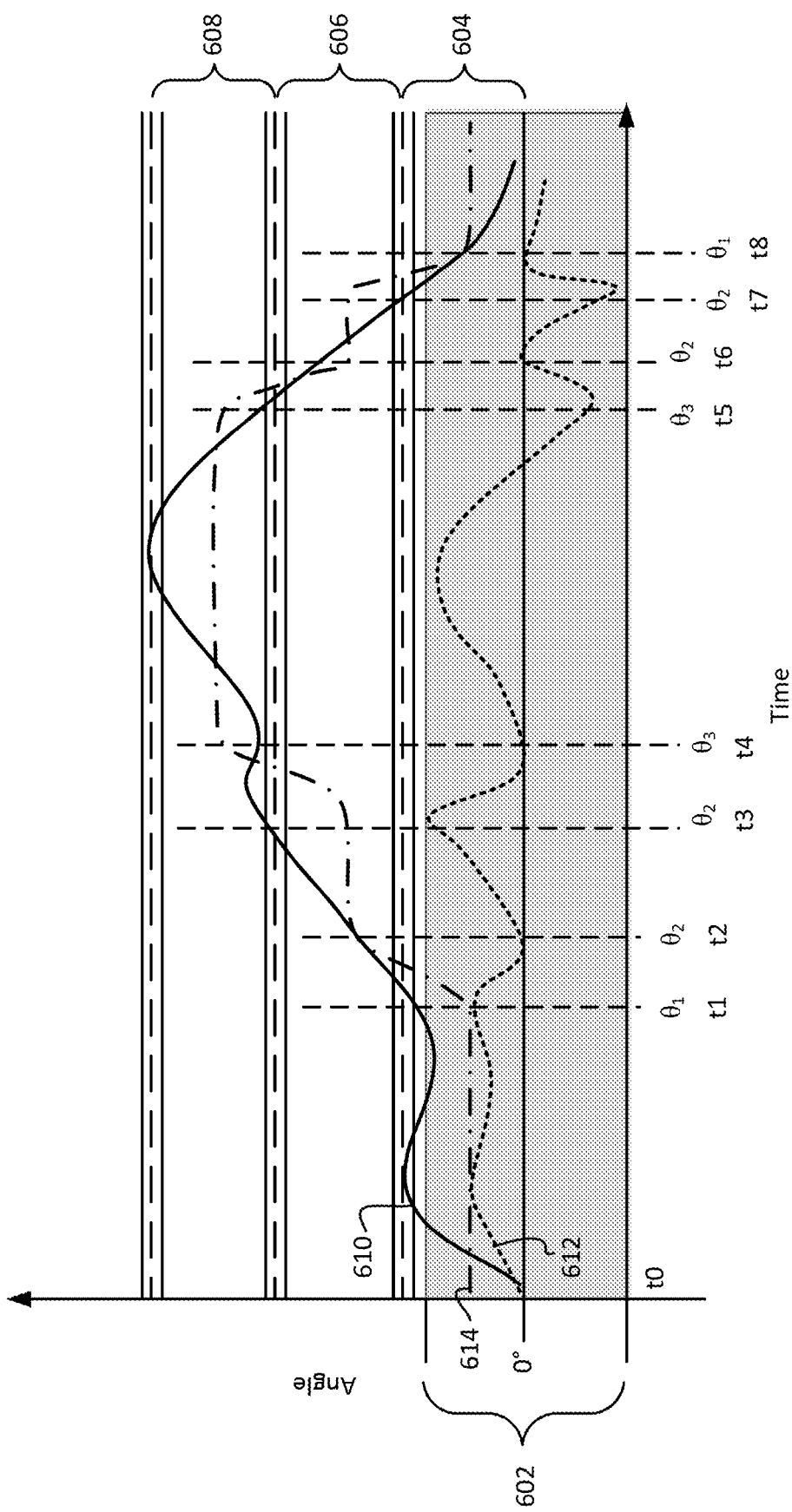
FIG. 6 is a graph 600 depicting a method of operation in accordance with aspects of the disclosure.

FIG. 6 shows a graph 600 depicting example angles of the optical signal received at the first communication device 102, the first mirror 202, and the second mirror 204 over time along the first axis. 0° represents the respective default angle for the first mirror 202 or the second mirror 204. The second mirror range of motion 602 is shown as a shaded area about the 0° axis. Three zones of the plurality of zones are depicted as zones 604, 606, and 608, each of which is approximately 50% of the second mirror range of motion. Zones in the negative range of motion also exist but are omitted to simplify the illustration. Angle positions of a tracked optical signal, the second mirror 204, and the first mirror 202 over time are shown in the graph 600 as lines 610 (solid line), 612 (dashed line), and 614 (dash-dot line), respectively. As shown in FIG. 6, the one or more processors 104 initially track a position of the optical signal between time t0 and t1 by moving the second mirror 204 between 0° and approximately 15° while the first mirror 202 is locked at first angle θ1, or 15°.

At block 506, the one or more processors 104 may move the first mirror 202 to a second angle different from the first angle using the first mirror actuator 212 when the optical signal reaches an edge of the zone. The second angle is in a direction of the optical signal motion from the first angle. In addition, the second angle may be a set interval from the first angle, such as 30°. In some implementations, the one or more processors 104 may have a plurality of predetermined angles for the first mirror 202. As shown in FIG. 6, the optical signal reaches the upper edge of zone 604 at time t1 and moves into zone 606. At time t1, the one or more processors 104 move the first mirror 202 from the first angle θ1 to a second angle θ2, or 45°. Once the first mirror 202 is moved to the second angle, the one or more processors 104 may hold the first mirror 202 at the second angle without power, such as by locking the first mirror 202 in place at the second angle.

At block 508, as the first mirror 202 is moved from the first angle to the second angle, the one or more processors may move the second mirror 204 to a default angle of the second mirror, or zero-angle, to reset a pointing direction of the second mirror. The second mirror 204 may be moved in an opposite direction than the first mirror 202. As shown in FIG. 6, as the first mirror 202 is moved from the first angle θ1 to the second angle θ2 from time t1 to time t2, the second mirror 204 is moved from an actuated angle at approximately 15° back to the default angle of the second mirror.

When within a given zone of the plurality of zones, the process in blocks 504 and 506 may be performed. During transitions between two zones of the plurality of zones, the process in block 508 may be performed. As shown in the example in FIG. 6, between times t2 and t3, the optical signal is tracked in zone 606. Between times t2 and t3, the first mirror 202 is held at the second angle θ2 while the second mirror 204 is rotated between 0° and 30°. At time t3, the optical signal reaches the upper edge of zone 606 and moves into zone 608. At time t3 through to time t4, therefore, the first mirror 202 is transitioned from the second angle θ2 to a third angle θ3, or 75°, while the second mirror 204 is rotated back to the default angle of the second mirror. From time t4 to time t5, the first mirror 202 is held at the third angle θ3 while the second mirror 204 is rotated between −15° and 30° to track the optical signal in zone 608. At time t5, the optical signal is tracked at the lower edge of zone 608 and moves back into zone 606. Between times t5 and t6, therefore, the first mirror 202 is moved from the third angle θ3 back to the second angle θ2, and the second mirror 204 is moved back to the default angle. Between times t6 and t7, the optical signal is tracked in zone 606 by moving the second mirror 204 between 0° and −30°. At time t7, the optical signal is tracked at the lower edge of zone 606 and moving into zone 604. Therefore at time t7, the first mirror 202 is moved from the second angle θ2 back down to the first angle θ1. As the first mirror 202 is transitioned to the first angle θ1 between times t7 and t8, the second mirror 204 is moved back to the default angle.

At block 510, the one or more processors 104 may operate the first communication device 102 according to the received optical signal. For example, the one or more processors 104 may further transmit the optical signal through the network 400 according to the received optical signal. The one or more processors may additionally or alternatively adjust a pointing direction of the first communication device 102, such as by controlling a gimbal.

Alternatively, the one or more processors 104 may use the second mirror actuator 214 to move the second mirror 204 to track an optical signal within a first zone in an area of coverage of the second mirror 204, rather than the area of coverage of the first communication device 102. In this example, the first zone may be defined as a percentage of the whole area of coverage of the second mirror 204, such as 50% or 75% or another percentage less than 100%. The zone and the whole area of coverage may be concentric. For an example along a first axis, the second mirror may be configured to move about the first axis from −30° to 30°. The zone may be 50% of the full range of motion and may therefore be −15° to 15°. The one or more processors 104 may keep the first mirror 202 stationary as described above in block 504. The one or more processors may detect that the second mirror 204 is moved to an angle at an edge of the zone and move the first mirror 202 to center the zone of the second mirror 204 on the angle. In other words, the first mirror 202 may be moved to the angle such that the default angle of the second mirror 204 is pointed along the angle. In another example, the first mirror 202 may be moved to center the zone of the second mirror 204 to an average pointing direction of a plurality of pointing directions in a previous time frame, such as 10 seconds or more or less. As the first mirror 202 is moved, the second mirror 204 may also be moved to the default angle to reset a pointing direction of the second mirror.

Figure 7:
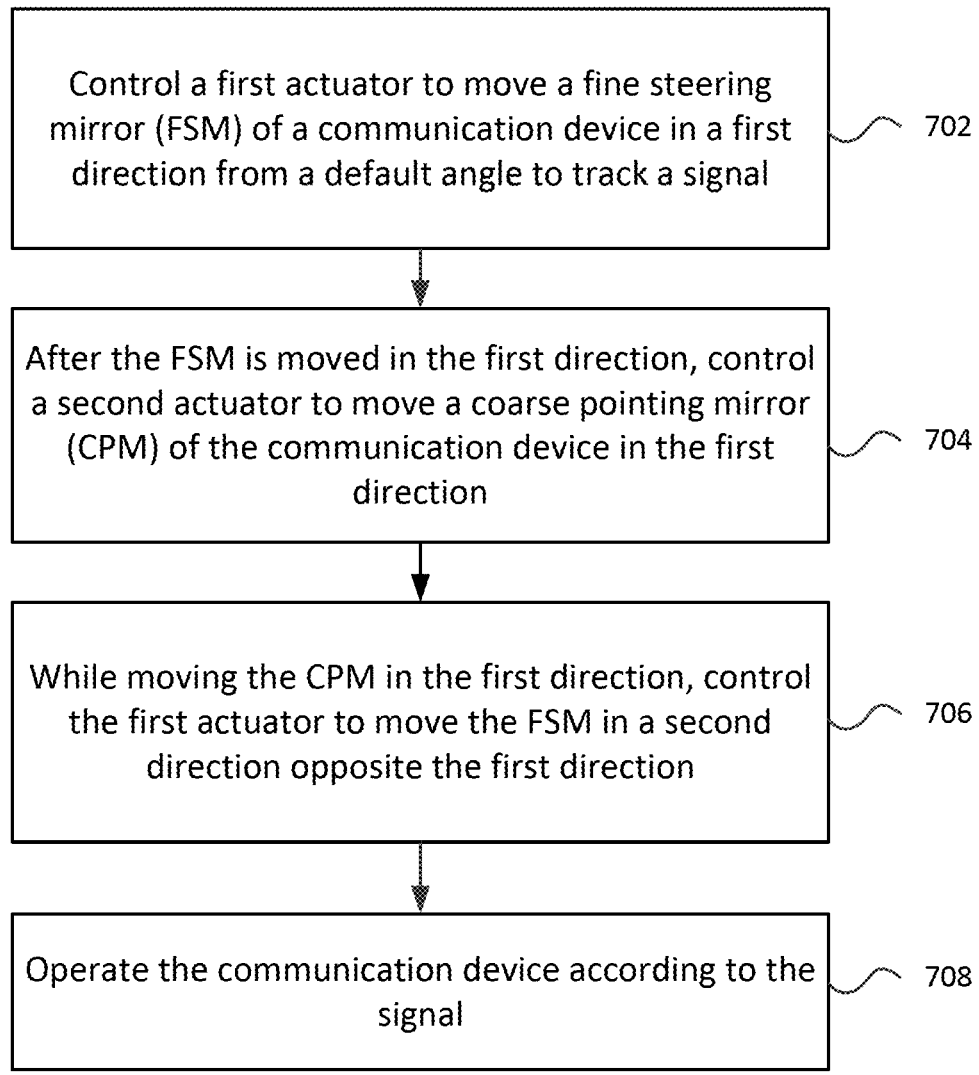
FIG. 7 is a flow diagram 700 in accordance with aspects of the disclosure.

In FIG. 7, flow diagram 700 is shown in accordance with the second embodiment that may be performed by the one or more processors 104 of the first communication device 102. While FIG. 7 shows blocks in a particular order, the order may be varied and multiple operations may be performed simultaneously. Also, operations may be added or omitted.

At block 702, the one or more processors 104 move the second mirror 204 in a first direction from a default angle using the second mirror actuator 214 to track an optical signal. In some examples, the one or more processors 104 may further determine that the second mirror 204 has been moved in the first direction past a threshold angle. At block 704, after the second mirror 204 is moved in the first direction, the one or more processors 104 may move the first mirror 202 in the first direction. The first mirror 202 may be moved after the second mirror is moved in the first direction past the threshold angle. At block 706, simultaneous with moving the first mirror 202 in the first direction, the one or more processors 104 may move the second mirror 204 in a second direction opposite the first direction back towards the default angle of the second mirror 204. The process may then be repeated to continually track the optical signal. At block 708, the one or more processors 104 may operate the first communication device according to the received optical signal as described in block 510.

In another example of the second embodiment, the one or more processors 104 may move the second mirror 204 in a plurality of directions over a first period of time. The one or more processors 104 may average the plurality of directions to determine the first direction for the first period of time. The first period of time may be, for example, 10 seconds, or more or less. The one or more processors 104 may then move the first mirror 202 in the determined first direction after the first period of time and move the second mirror 204 back towards the default angle of the second mirror.

The operation of the communication device 102 described above may additionally or alternatively be utilized for the purpose of controlling a pointing direction of a transmitted optical signal, rather than tracking a received signal. In this implementation, the one or more processors 104 may receive a signal from a remote communication device, such as communication device 122, where the received signal indicates a location of the transmitted optical signal on a tracking sensor of the remote communication device. The first mirror 202 and the second mirror 204 of the communication device 102 may then be moved as a center of the tracking sensor moves relative to the transmitted optical signal. In other words, the first mirror 202 and the second mirror 204 may be moved to track the center of the tracking sensor rather than a received optical signal.

The features described above provide an FSOC system that accurately points and tracks optical signals. In addition, the features can reduce the overall cost to operate the actuators, and may extend the lifetime and performance of the system. In addition, power savings to the system may also be achieved.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for transmitting and receiving optical signals, the system including:
   a first mirror of a communication device;
   a first mirror actuator configured to control a pointing direction of the first mirror;
   a second mirror of the communication device;
   a second mirror actuator configured to control a pointing direction of the second mirror; and
   one or more processors operatively coupled to the first mirror actuator and the second mirror actuator, the one or more processors being configured to:
     direct the second mirror actuator to move the second mirror to track a signal within a first zone of a plurality of range of motion zones in an area of coverage of the communication device,
     wherein each zone is adjacent to at least one other zone of the plurality of range of motion zones, and
     keep the first mirror stationary at a first angle during a first time period while using the second mirror to track the signal in the first zone;

when the signal reaches an edge of the first zone at a first time, direct the first mirror actuator to move the first mirror, during a second time period starting at the first time and ending at a second time, from the first angle to a second angle in a direction of motion of the signal as the signal moves into a second zone of the plurality of range of motion zones;

direct the second mirror actuator to move the second mirror, during the second time period, to a default angle while moving the first mirror from the first angle to the second angle; and keep the first mirror stationary at the second angle during a third time period starting at the second time while using the second mirror to track the signal in the second zone.

2. The system of claim 1, wherein the first mirror is kept stationary by locking the first mirror in place and turning off power to the first mirror actuator.

3. The system of claim 1, wherein the area of each zone of the plurality of range of motion zones does not overlap with any other zone of the plurality of range of motion zones and is approximately a same percentage of a range of motion of the second mirror.

4. The system of claim 1, wherein the area of coverage of the communication device is determined by combining a range of motion of the first mirror and a range of motion of the second mirror.

5. The system of claim 1, wherein the one or more processors are further configured to:

when the signal reaches an edge of the second zone at a third time, direct the first mirror actuator to move the first mirror, during a fourth time period starting at the third time and ending at a fourth time, from the second angle to a third angle in a direction of motion of the signal as the signal moves into a third zone of the plurality of range of motion zones; and keep the first mirror stationary at the third angle during a fifth time period starting at the fourth time while using the second mirror to track the signal in the third zone.

6. The system of claim 1, wherein the second angle is a set interval from the first angle.

7. The system of claim 1, further comprising the communication device.

8. A method for transmitting and receiving optical signals, the method including:

controlling, by one or more processors, a first mirror actuator to control a pointing direction of a first mirror of a communication device; and controlling, by the one or more processors, a second mirror actuator to control a pointing direction of a second mirror of the communication device, wherein the second mirror actuator moves the second mirror to track a signal within a first zone of a plurality of range of motion zones in an area of coverage of the communication device, wherein each zone is adjacent to at least one other zone of the plurality of range of motion zones, wherein the first mirror is kept stationary at a first angle during a first period while the second mirror is used to track the signal in the first zone, wherein, when the signal reaches an edge of the first zone at a first time, the first mirror actuator moves the first mirror, during a second time period starting at the first time and ending at a second time, from the first angle to a second angle in a direction of motion of the signal as the signal moves into a second zone of the plurality of range of motion zones, wherein the second mirror actuator moves the second mirror, during the second time period, to a default angle while the first mirror actuator moves the first mirror from the first angle to the second angle, and wherein first mirror is kept stationary at the second angle during a third time period starting at the second time while the second mirror is used to track the signal in the second zone.

9. The method of claim 8, wherein the first mirror is kept stationary by locking the first mirror in place and turning off power to the first mirror actuator.

10. The method of claim 8, wherein the area of each zone of the plurality of range of motion zones does not overlap with any other zone of the plurality of range of motion zones and is approximately a same percentage of a range of motion of the second mirror.

11. The method of claim 8, further comprising determining, by the one or more processors, the area of coverage of the communication device by combining a range of motion of the first mirror and a range of motion of the second mirror.

12. The method of claim 8, wherein, when the signal reaches an edge of the second zone at a third time, the first mirror actuator moves the first mirror, during a fourth time period starting at the third time and ending at a fourth time, from the second angle to a third angle in a direction of motion of the signal as the signal moves into a third zone of the plurality of range of motion zones, and wherein the first mirror is kept stationary at the third angle during a fifth time period starting at the fourth time while the second mirror is used to track the signal in the third zone.

13. The method of claim 8, wherein the second angle is a set interval from the first angle.

\* \* \* \* \*